Inventor:
Rudolf Nelle
By Michael S. Striker
his ATTORNEY

United States Patent Office 3,128,895
Patented Apr. 14, 1964

3,128,895
PROTECTIVE WRAPPERS FOR BREAKABLE ARTICLES
Rudolf Nelle, Nordenham, Oldenburg, Germany, assignor to Norddeutsche Seekabelwerke Aktiengesellschaft, Nordenham, Oldenburg, Germany
Filed Jan. 24, 1961, Ser. No. 84,668
Claims priority, application Germany Jan. 26, 1960
2 Claims. (Cl. 215—12)

The present invention relates to protective wrappers, blankets and supports for readily breakable and surface-sensitive articles consisting of glass, china and like brittle substances. More particularly, the invention relates to an improved single- or multi-layer netting of thermoplastic material.

It is already known to produce a knotless tubular netting of synthetic plastic material, for example by extruding the filaments through the orifices of two concentric nozzles which rotate with respect to each other. Such tubular netting may be utilized as a protecting and insulating sheath for electric conductors or the like.

An object of the present invention is to provide a very simple and inexpensive wrapper for articles made of glass or like brittle materials which may but need not be permanently connected with the article and which is capable of properly protecting the article during shipment, storage or handling.

Another object of the invention is to provide an elastic wrapper of the just outlined characteristics which need not be manufactured in many sizes and shapes because it may be readily expanded or cut to be applied to differently dimensioned articles.

A further object of the invention is to provide a plastic netting which, while protecting a brittle article, may simultaneously enhance the appearance and sales appeal of the article.

An additional object of the instant invention is to provide a plastic netting of the just described type which may replace the customary straw wrappers for bottles or cushions consisting of wood shavings such as are often used to form intermediate layers between the rows of stacked dishes, plates, cups and similar chinaware.

A concomitant object of the invention is to provide a durable and hence reusable wrapper of the above outlined characteristics which can absorb moisture and which allows full contact of wrapped articles with the surrounding atmosphere.

Still another object of the invention is to provide a wrapper of the above outlined type which may be readily combined with one or more similar wrappers to form an elastic cushion of any desired thickness.

With the above objects in view, the invention resides in the provision of a netting whose single- or multi-thread filaments consist of a foamed thermoplastic material, such as polyethylene, polyurethane, polystyrol and many others. A very important advantage of filaments consisting of foamed plastic materials is that the weight of the netting is reduced to a minimum and also that the elasticity of the net is surprisingly high so that say a tubular netting may be used as a protective wrapper for differently dimensioned bottles or like articles, and that the netting assumes the shape of the article if applied thereto in at least slightly expanded condition. The uniformly or differently colored individual filaments which cross each other to form any desired pattern are connected at the points of intersection by an adhesive force rather than by the formation of hard, non-yielding knots such as could reduce the cushioning effect of the improved netting.

In the production of such nettings, the starting thermoplastic material contains a suitable blowing agent so that the extruded filaments are of foamy consistency and, if the extruding step produces a tubular netting, the latter may be cut longitudinally or spirally so as to obtain a flat wrapper which may be used for insertion between stacked dishes or like breakable articles. Such flat wrappers may also be used to protect a bottle or the like by connecting their overlapping edges by means of adhesive strips or the like.

Of course, the netting need not be extruded in tubular form since it is equally possible to extrude the filaments individually and to join the filaments into the form of a netting in a subsequent step.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
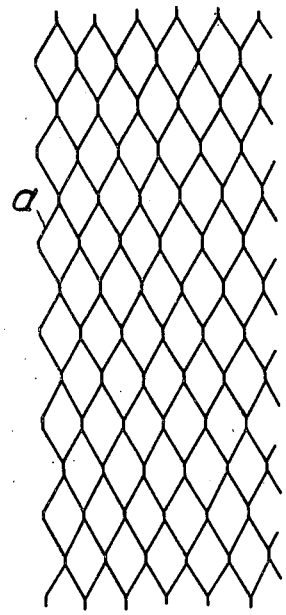
FIG. 1 is a schematic elevational view of a flat netting embodying the invention.

Referring now in greater detail to the illustrated embodiments, and first to FIG. 1, there is shown a portion of a flat netting $a$ which consists of crossing filaments made of a foamed elastic thermoplastic material such as synthetic rubber, polyvinyl chloride or polyurethane; of a soft non-elastic material such as a mixture of viscose and polyurethane; or of a strong, rigid and simultaneously insulating material on the basis of polyvinyl chloride, caoutchouc, polyurethane or polystyrol and many others. Hard foamed plastic filaments with insulating characteristics may also be produced from urea and phenol formaldehyde resins. The important feature of filaments forming the improved netting $a$ is that they consist of foamed thermoplastic material which will form a soft wrapper, blanket or support for one or more breakable articles, such as chinaware, articles made of glass, as well as any other articles which must or should be protected by a soft, lightweight and inexpensive layer of yieldable cushioning material.

The filaments of the netting $a$ form a knot-free structure, i.e. the points at which the filaments intersect each other are not in the form of knots because the intersecting filaments are secured to each other by adhesive force without being intermeshed, intertwined or otherwise joined in a manner which could produce hard knot-like zones in the netting $a$.

Figure 4:
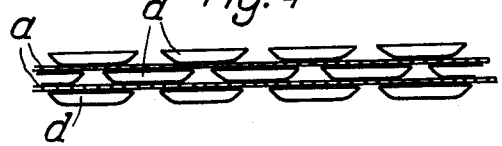
FIG. 4 is a schematic side elevational view of a stack of breakable articles with layers of flat netting disposed between the horizontal rows of articles.

For example, the netting $a$ may be produced in an extruding apparatus of the type disclosed in a copending application Serial No. 82,244, filed January 1, 1961, and entitled "Extruding Apparatus for the Production of Multi-Walled Plastic Tubes," which was filed by me jointly with Arnold Vogts. As shown in FIG. 4, the netting $a$ may be placed between or beneath the horizontal rows of a stack of breakable dishes *d* or other articles made of china, glass or like material. Of course, it is equally possible to wrap individual nettings *a* about each of the dishes *d*, or to utilize two or more nettings between the horizontal rows of breakable articles. Still further, the articles *d* may consist of a non-breakable material whose surface is sensitive to scratches, and the netting *a* then prevents direct contact between the adjacent articles.

In the manufacture of the netting *a* with the help of an extruding apparatus disclosed in the aforementioned copending application, the filaments are extruded in such a way that they immediately cross and adhere to each other at the points of intersection so that the original article is a tube which is substantially cut in the longitudinal direction or at a bias so as to form a flat netting of the type shown in FIG. 1.

Figure 2:
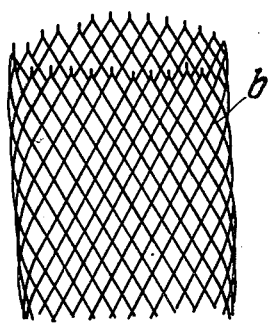
FIG. 2 is a fragmentary perspective view of a tubular netting.
Figure 3:
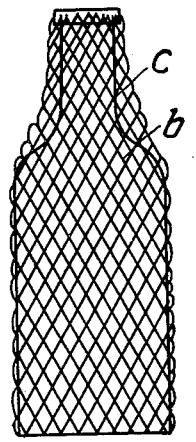
FIG. 3 is a schematic side elevational view of an article in the form of a glass bottle with the tubular netting applied thereto.

FIG. 2 shows a netting *b* which forms a tube and which, as illustrated in FIG. 3, may be used as a wrapper or sheath for a breakable article in the form of a glass bottle *c*. The individual filaments of this tubular netting again consist of a foamed thermoplastic material which is preferably at least slightly elastic so as to adhere to and to assume the general shape of the bottle *c*. It is often sufficient if the tubular netting *b* is elastically expandable only in a radial direction, i.e. in a direction to increase its diameter to an extent necessary to permit the application of the expanded netting to the bottle *c* or to a similar article. As stated before, the elastically expanded netting *b* then assumes the shape of and adheres to the bottle *c*. Of course, this netting need not be removed once the bottle *c* reaches its destination, e.g. a liquor store, a grocery shop or a pharmacy, but may remain on the bottle as a permanent protective and/or decorative wrapper even after the bottle is purchased by the ultimate user of its contents. The mesh, thickness, longitudinal and/or transverse elasticity, and color of the netting *a* or *b* may be varied as desired in dependency on the utilization of such nettings.

Figures 5A, 5B, 5C, 5D:
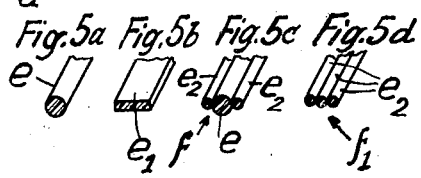
FIGS. 5a to 5d are schematic fragmentary perspective views of various filaments for the improved netting.

FIGS. 5a to 5d show different forms of filaments for the nettings *a* and *b*. It will be noted that the filaments may be of circular cross-sectional contour (see the filament *e* in FIG. 5a), that the netting may consist of filaments $e_1$ having a polygonal (e.g. rectangular) cross-sectional contour as shown in FIG. 5b, that the composite filaments *f* of the type shown in FIG. 5c may consist of several round threads *e* and $e_2$ of different diameter, or that the netting may consist of composite filaments $f_1$ consisting of a plurality of interconnected round threads $e_2$ of equal diameters. Of course, one can utilize any other combination of circular, oval, polygonal or otherwise shaped simple or composite filaments.

Figure 6:
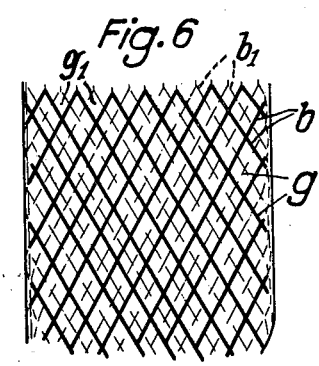
FIG. 6 is a fragmentary side elevational view of a tubular netting which comprises a plurality of concentric layers.

FIG. 6 illustrates that a composite tubular netting may consist of two or even more concentric tubular layers *b*, $b_1$ which are preferably arranged in such a way that their openings *g*, $g_1$ are at least slightly staggered with respect to each other. Analogously, the arrangement of FIG. 4 may utilize composite flat nettings each of which may consist of two or more layers *a* whose openings are staggered with respect to each other.

Figure 7:
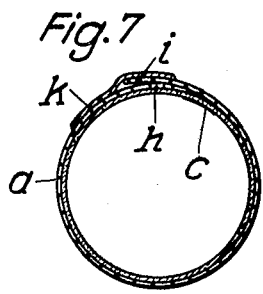
FIG. 7 is a section through a bottle-like article showing the manner in which a flat netting may be secured to the article to form a protective tubular wrapper thereabout.

Referring finally to FIG. 7, there is shown that a flat netting *a* may be wrapped about a glass bottle *c* and its overlapping edge portions *h*, *i* secured to each other by one or more adhesive strips *k* or the like. The strips *k* preferably also consist of a synthetic plastic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A structure of the character described comprising, in combination, a bottle-like article consisting of glass-like material; a protective wrapper surrounding said article, said wrapper consisting of an elastically expandable netting comprising at least one layer of intersecting filaments consisting of foamed stretchable thermoplastic material, said layer having overlapping edge portions so as to form a tube about the article and the filaments of said layer overlapping and being connected to each other at the points of intersection so that such points are free of knots; and means for connecting said edge portions to each other.

2. A structure of the character described comprising, in combination, a breakable article; and a protective wrapper surrounding said article, said wrapper consisting of an elastically expandable netting comprising at least one layer of intersecting filaments consisting of foamed stretchable thermoplastic material, said layer forming a tube about the article, and the filaments of said layer overlapping and being connected to each other at the points of intersection so that such points are free of knots.

References Cited in the file of this patent

UNITED STATES PATENTS

| | | |
|---|---|---|
| 229,775 | Thompson | July 6, 1880 |
| 234,582 | Kacer | Nov. 16, 1880 |
| 381,290 | Stewart | Apr. 17, 1889 |
| 411,371 | Biedinger | Sept. 17, 1889 |
| 799,069 | Meyer | Sept. 12, 1905 |
| 1,120,127 | Broberg | Dec. 8, 1914 |
| 2,035,384 | Hinchliff | Mar. 24, 1936 |
| 2,058,915 | Scholl | Oct. 27, 1936 |
| 2,081,409 | Rush | May 25, 1937 |
| 2,741,386 | Williams | Apr. 10, 1956 |
| 2,797,731 | Carlson | July 2, 1957 |
| 3,027,286 | Kurhan | Mar. 27, 1962 |
| 3,031,095 | Loughran | Apr. 24, 1962 |
| 3,040,968 | Long et al. | June 26, 1962 |
| 3,049,277 | Shappell | Aug. 14, 1962 |

FOREIGN PATENTS

| | | |
|---|---|---|
| 497,230 | Belgium | Nov. 15, 1950 |
| 1,179,626 | France | Dec. 22, 1958 |
| 1,186,206 | France | Feb. 23, 1959 |